(12) United States Patent
Yokota

(10) Patent No.: US 9,031,588 B2
(45) Date of Patent: May 12, 2015

(54) CELLULAR PHONE WITH MAIL FUNCTION

(71) Applicant: KYOCERA Corporation, Kyoto (JP)

(72) Inventor: Nozomi Yokota, Osaka (JP)

(73) Assignee: KYOCERA Corporation, Kyoto (JP)

(*) Notice: Subject to any disclaimer, the term of this patent is extended or adjusted under 35 U.S.C. 154(b) by 0 days.

(21) Appl. No.: 14/266,735

(22) Filed: Apr. 30, 2014

(65) Prior Publication Data

US 2014/0323168 A1    Oct. 30, 2014

Related U.S. Application Data

(63) Continuation of application No. 12/303,405, filed as application No. PCT/JP2007/060450 on May 22, 2007, now abandoned.

(30) Foreign Application Priority Data

Jun. 6, 2006    (JP) .................................. 2006-157596

(51) Int. Cl.
*H04W 4/00* (2009.01)
*H04M 1/725* (2006.01)
*H04W 4/14* (2009.01)
*H04L 12/58* (2006.01)
*H04M 1/2745* (2006.01)
*H04M 1/64* (2006.01)

(52) U.S. Cl.
CPC ............... *H04W 4/14* (2013.01); *H04L 51/14* (2013.01); *H04M 1/274508* (2013.01); *H04M 1/64* (2013.01); *H04M 1/72552* (2013.01); *H04L 51/28* (2013.01); *H04L 51/02* (2013.01)

(58) Field of Classification Search
USPC ..................... 455/466, 412.1–412.2, 413, 455/414.1–414.3
See application file for complete search history.

(56) References Cited

U.S. PATENT DOCUMENTS

| | | |
|---|---|---|
| 6,226,500 B1 | 5/2001 | Nonami |
| 7,450,936 B2 | 11/2008 | Kim |
| 7,606,585 B2 | 10/2009 | Suan |
| 7,783,283 B2 | 8/2010 | Kuusinen et al. |

(Continued)

FOREIGN PATENT DOCUMENTS

| | | |
|---|---|---|
| EP | 0783219 A2 | 7/1997 |
| JP | 2004-260416 | 9/2004 |

(Continued)

OTHER PUBLICATIONS

International search report dated Aug. 28, 2007, issued for counterpart PCT Application No. PCT/JP2007/060450.
European Search Report dated Mar. 24, 2011 issued for counterpart European Application No. 07743884.4.

(Continued)

*Primary Examiner* — Brandon Miller
(74) *Attorney, Agent, or Firm* — Procopio, Cory, Hargreaves & Savitch LLP

(57) ABSTRACT

The mobile telephone (i) stores therein an address book including one or more pieces of mail-transmission destination information each pertaining to a communication party, (ii) makes a judgment, when an incoming event occurs, whether the incoming event meets a specific requirement, (iii) selects one or more communication parties from the address book when the judgment is affirmative; and (iv) transmits a predetermined mail to destinations of the selected communication parties using pieces of mail-transmission destination information corresponding to the selected communication parties.

9 Claims, 8 Drawing Sheets

(56) References Cited

U.S. PATENT DOCUMENTS

2004/0048602 A1    3/2004   Tamura
2005/0037730 A1    2/2005   Montague
2005/0037762 A1    2/2005   Gurbani et al.
2005/0153686 A1*   7/2005   Kall et al. .................. 455/412.1
2006/0026649 A1    2/2006   Shieh
2007/0018797 A1    1/2007   Chen et al.
2007/0238473 A1*  10/2007   Huang et al. .................. 455/466

FOREIGN PATENT DOCUMENTS

JP    2005-136934      5/2005
JP    2005-136934 A    5/2005

OTHER PUBLICATIONS

Notification of Reasons for Refusal dated Dec. 8, 2009 issued for counterpart Japanese application No. 2006-157596.

* cited by examiner

FIG. 3

| 1610 | | |
|---|---|---|
| 1611 | REGISTRATION NUMBER | 001 |
| 1612 | NAME | ICHIRO TANAKA |
| 1613 | TELEPHONE NUMBER (USUAL) | 090-111-2222 |
| 1614 | TELEPHONE NUMBER | 06-1234-5678 |
| 1615 | MAIL ADDRESS | xxx@yyyy.co.jp |
| 1616 | GROUP NUMBER | 1 |
| 1617 | NOTIFICATION NECESSITY (REQUIRED/NOT REQUIRED) | REQUIRED |
| 1618 | NOTIFICATION RECORD (NOTIFIED/NOT NOTIFIED) | NOTIFIED |
| 1619 | NOTIFICATION MEANS (MAIL/AUDIO) | MAIL |

FIG. 5A

```
Subject:NOTIFICATION
MESSAGE:
  I AM NOT CARRYING MY
USUAL MOBILE TELEPHONE
WITH ME TODAY.
  PLEASE REACH ME ON
THE FOLLOWING NUMBER
OR ADDRESS INSTEAD.

090-123-4567
addr01@xxx.co.jp
```
1710

FIG. 5B

```
  I AM NOT CARRYING MY
USUAL MOBILE TELEPHONE
WITH ME TODAY.
  PLEASE REACH ME ON
THE FOLLOWING NUMBER
OR ADDRESS INSTEAD.
090-123-4567
addr01@xxx.co.jp
```
1810

CELLULAR PHONE WITH MAIL FUNCTION

CROSS-REFERENCE TO RELATED APPLICATIONS

The present application is a continuation of U.S. application Ser. No. 12/303,405 which is the US National Stage Application of PCT Application No: PCT/JP2007/060450 filed on May 22, 2007, which claims priority under 35 U.S.C. §119 to Japanese Patent Application No.: 2006-157596, filed on Jun. 6, 2006. The content of each of these applications are incorporated herein by reference in their entirety.

TECHNICAL FIELD

The present invention relates to a function of a mobile telephone to transmit mail or voice message, especially to a technology for indicating a mobile telephone to transmit mail or the like via radio communication.

BACKGROUND ART

Mobile telephones have become widely used in recent years, and it is often the case that when people try to reach someone, a call is made to his/her mobile telephone no matter whether the reason of the call is a business or personal purpose.

This is because a call is made directly to the telephone carried by the person whom one wants to contact, and it is therefore guaranteed to reach the person no matter where he/she is. Additionally, even in the case if the person cannot answer a call right away, it is possible to make direct contact with the person by sending message by mail.

However, because of its portability, we may forget to take a mobile telephone with us—for example, in the case of coming to the office leaving the mobile telephone at home.

There is a technology for, in such a case, allowing the owner of the mobile telephone left behind to instruct the mobile telephone from remote location to change its answering message. This technology is designed so that after the mobile telephone left behind receives a predetermined mail from its owner, it sends back to a caller of an incoming call or a mail sender a reply indicating that the mobile telephone has been left behind (see Patent Reference 1).

The technology provides an advantage of hearing from the caller or mail sender again because the mail informing of the mobile telephone being left behind is replied to the person.

<Patent Reference 1> Japanese Laid-open Patent Application Publication No. 2004-260416

DISCLOSURE OF THE INVENTION

Problems that the Invention is to Solve

There is, however, sometimes the case that it is not enough to simply send back a mail informing of the mobile telephone being left behind to the communication party having called or sent message to the mobile telephone.

This is, for example, the case when the owner of the mobile telephone has to make contact with a certain party; however, contact information of the party is held only in the mobile telephone, or when some incoming contact is scheduled.

Namely, it is the case when the owner desires to preemptively notice alternative contact information of the owner without waiting for contact from communication parties.

Thus, the present invention aims at providing a mobile telephone that is able to, when for some reason the owner is not carrying the mobile telephone which he/she usually uses, preemptively notice specific communication parties accordingly.

Means to Solve the Problem

In order to solve the above problem, the mobile telephone of the present invention has a mail transmission function and comprises: a storage unit storing therein an address book including one or more pieces of mail-transmission destination information each pertaining to a communication party; a judgment unit operable to make a judgment, when an incoming event occurs, whether the incoming event meets a specific requirement; a selection unit operable to select one or more communication parties from the address book when the judgment is affirmative; and a transmission unit operable to transmit a predetermined mail to the selected communication parties using pieces of mail-transmission destination information corresponding to the selected communication parties.

Advantageous Effects of the Invention

According to the above structure, the mobile telephone of the present invention is capable of transmitting a predetermined mail to communication parties selected from the address book when an incoming call or mail being received from the owner meets a specific requirement. Herewith, the owner of the mobile telephone is able to transmit a mail informing that the owner is not currently carrying the mobile phone, by making a call or the like from a remote location to the mobile telephone.

Here, the "mail" refers to a text message, such as so-called e-mail or a text message transmitted/received in a short message service. Accordingly, the "mail-transmission destination information" for a communication party refers to a mail address in the case when the "mail" is e-mail, and refers to a telephone number in the case when the "mail" is a text message in a short message.

Here, the mobile telephone may further comprise: a destination information specification unit operable to specify the pieces of mail-transmission destination information; and an operation unit operable to receive an operation from a user. In this case, when the operation unit receives a specific operation, the transmission unit transmits a mail relating to the predetermined mail to the pieces of mail-transmission destination information.

According to the above structure, with the specific operation, it is possible to transmit a mail relating to the predetermined mail to communication parties to which the predetermined mail has previously been transmitted. Herewith, the user is able to inform again these communication parties in a responsible manner, that the user is now carrying the mobile telephone.

The address book may include, with respect to each communication party, necessity information indicating necessity of transmission of the predetermined mail to the communication party, and the communication parties selected by the selection unit may be one or more communication parties whose necessity information indicates that the transmission is necessary.

According to the above structure, it is possible to preliminarily specify communication parties to which the predetermined mail is transmitted. Herewith, the user is able to transmit a mail informing that the user is not currently carrying the mobile telephone, only to communication parties that the user would like to inform.

Here, the address book may include, with respect to each communication party, selection information used by the selection unit to select the communication parties. In this case, the selection unit receives, when the incoming event occurs, a selection indicator indicating a condition of selecting the communication parties. The communication parties selected by the selection unit are one or more communication parties whose selection information corresponds to the received selection indicator.

According to the structure above, it is possible to, when the incoming event occurs, obtain information that specifies communication parties to be informed. Herewith, the user is able to dynamically decide communication parties for sending a mail informing that the user is not currently carrying the mobile telephone.

Here, the specific requirement may be that the incoming event occurs a predetermined number of times within a definite time frame.

According to the structure above, it is possible to transmit the predetermined mail by calling a predetermined number of times within a definite time frame. Herewith, the user is able to readily transmit a mail informing that the user is not currently carrying the mobile telephone.

Here, the specific requirement may be that the mobile telephone receives a predetermined tone signal.

According to the structure above, it is possible to transmit the predetermined mail by pressing a predetermined number to thereby transmit a predetermined tone signal. Herewith, the user is able to readily transmit a mail informing that the user is not currently carrying the mobile telephone, by using a public phone, for example.

Here, the specific requirement may be that the mobile telephone remains in call state for a predetermined period of time.

According to the structure above, it is possible to transmit the predetermined mail by ringing the mobile telephone a predetermined number of times. Herewith, the user is able to readily transmit a mail informing that the user is not currently carrying the mobile telephone.

Here, the mobile telephone may further comprise: an audio transmission unit operable to transmit a voice message. In this case, the address book includes one or more telephone numbers each pertaining to a communication party, and the transmission unit transmits the voice message to telephone numbers of the selected communication parties, instead of transmitting the predetermined mail.

According to the structure above, it is possible to transmit a voice message instead of the predetermined mail. Herewith, the user is able to inform communication parties having telephones with no mail function that the user is not currently carrying the mobile phone.

BRIEF DESCRIPTION OF THE DRAWINGS

FIG. 3 shows structural and content examples of an address book 1610;

FIG. 5A shows an example of a non-carried notification mail 1710; FIG. 5B shows an example of a non-carried notification voice message 1810;

EXPLANATION OF REFERENCES 1000, 3000 mobile telephone
1010 speaker
1020 microphone
1100 control unit
1110 operation judgment unit
1200 display unit
1300 man-machine interface unit
1400 communication unit
1500 communication party selection unit
1600 address book storage unit
1610 address book
1611 registration number
1612 name
1613 telephone number (usual)
1614 telephone number
1615 mail address
1616 group number
1617 notification necessity
1618 notification record
1619 notification means
1650 received mail information
1660 incoming number information
1700 non-carried notification mail storage unit
1710 non-carried notification mail
1720 cancellation notification mail
1800 non-carried notification voice message storage unit
1810 non-carried notification voice message
1820 cancellation notification voice message
2000, 3010 land-line phone
3020 personal computer

BEST MODE FOR CARRYING OUT THE INVENTION

Embodiment 1
<Overview>
The mobile telephone of the present invention transmits, after receiving a certain operation from a remote location, a mail or a voice message notifying specific communication parties that the owner of the mobile telephone is not carrying the mobile telephone (hereinafter, referred to as "non-carried state").

In addition, the mobile telephone performs not only transmitting the preemptive notification but also transmitting a similar mail to inform the non-carried state when a mail or an incoming call is received (hereinafter, referred to as "reply process").

Furthermore, the mobile telephone stores communication parties to which the mail or the like informing its non-carried state has been transmitted, and notifies, when the non-carried state is cancelled—that is, when the owner carries the mobile telephone with him/her, those parties of the cancellation of the non-carried state.

Next, a description is given of the mobile telephone of the present invention.

In the present embodiment, assume that the way to make the notification—whether by mail or voice message—is predetermined in an address book. Mail and voice message to be transmitted have been preliminarily created, and transmission destinations can be selected based on the address book.

Additionally, the mobile telephone has a mail transmission and reception function and an auto answer function beside a normal conversation function.

<Structure>

Figure 1:
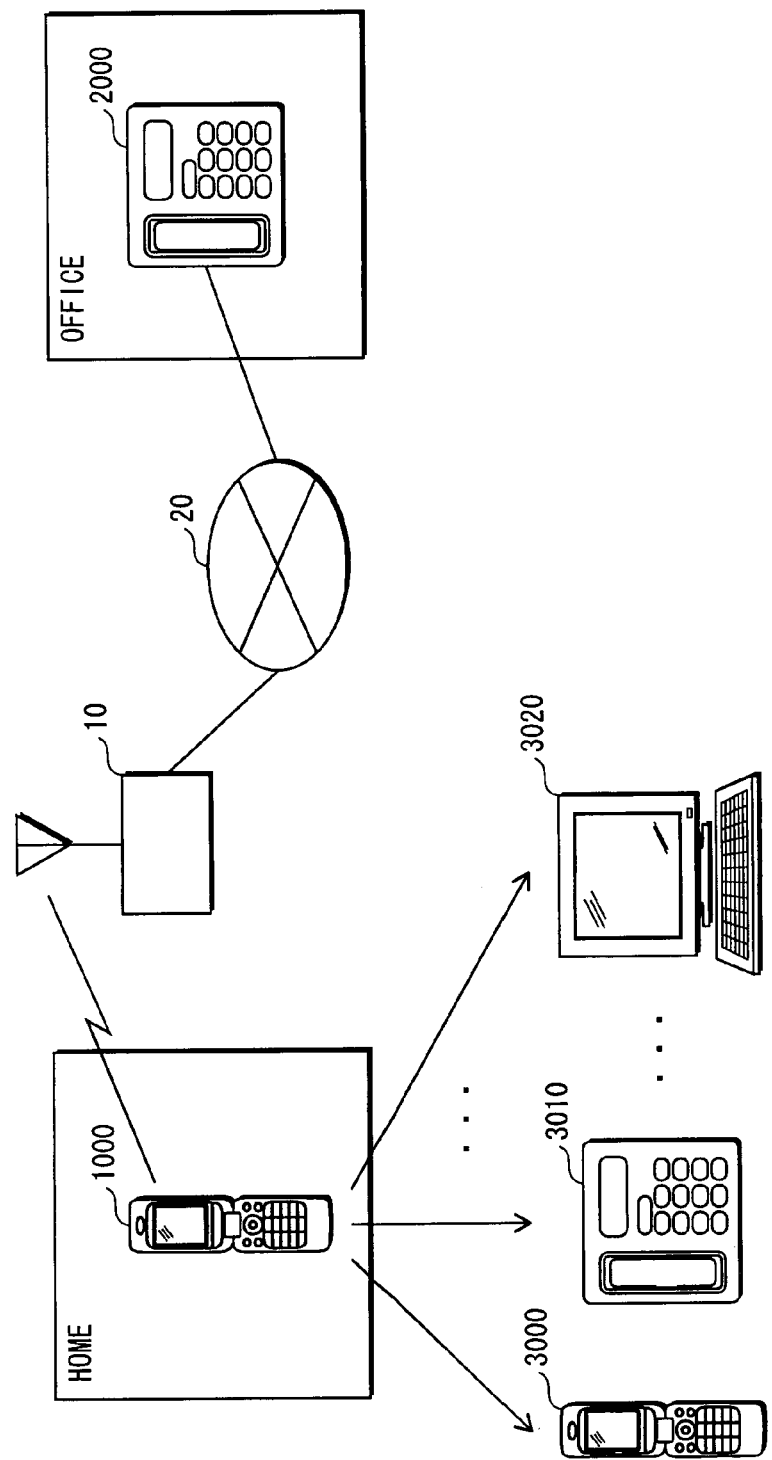
FIG. 1 shows a usage application of a mobile telephone according to an embodiment of the present invention.
Figure 2:
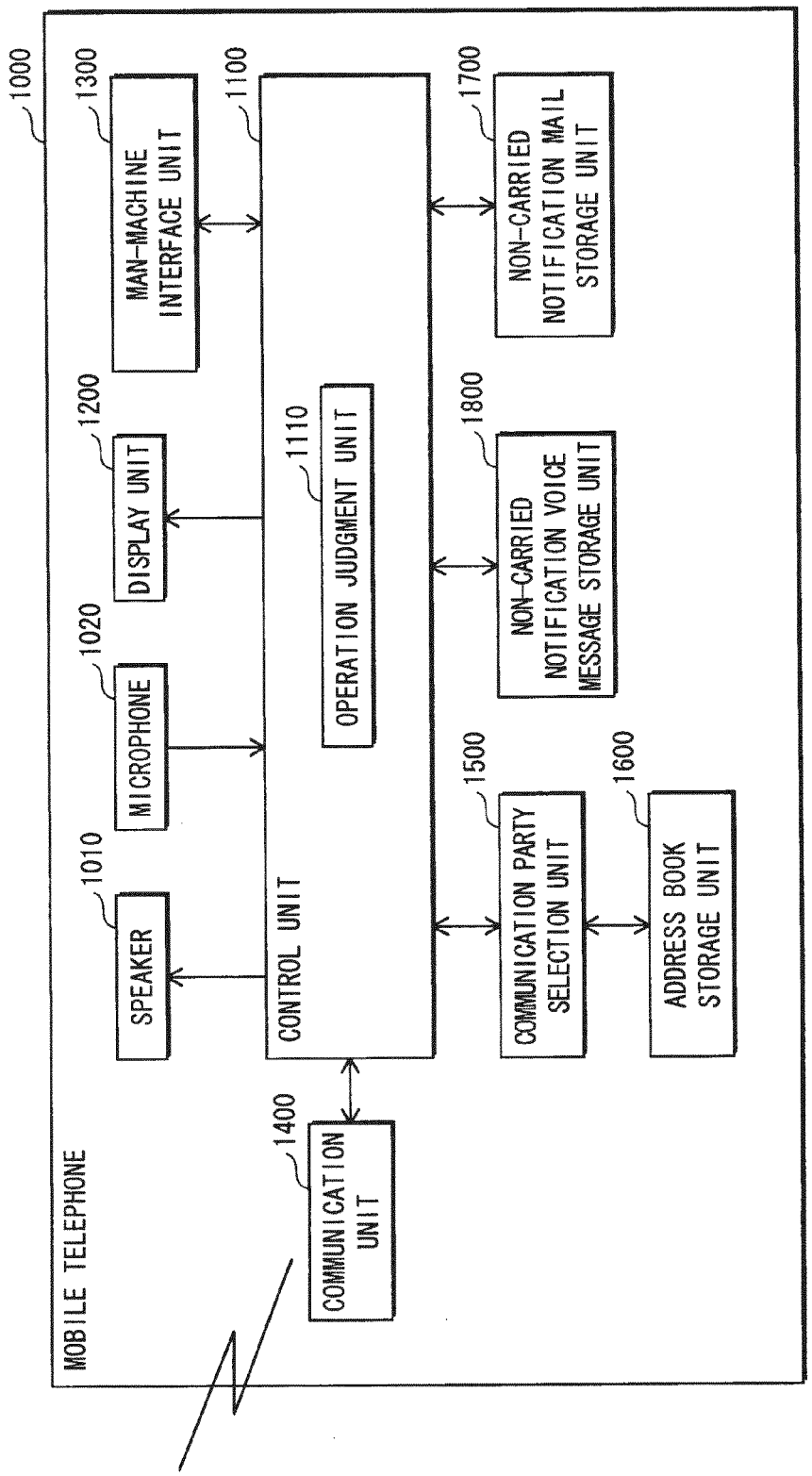
FIG. 2 is a function block diagram showing a structure of the mobile telephone.

First, the usage application of the mobile telephone according to the embodiment of the present invention is briefly explained with the aid of FIG. 1, and a function block diagram showing the structure of the mobile telephone is explained with the aid of FIG. 2.

FIG. 1 shows the usage application of the mobile telephone according to the embodiment of the present invention.

In this example, the owner of a mobile telephone 1000 has left the mobile telephone 1000 at home, and tries to make a notification from a land-line phone 2000 at the office to a mobile telephone 3000, a land-line phone 3010, a personal computer 3020, other PDA (Personal Digital Assistants) and the like of communication parties to which the non-carried state needs to be notified.

The operation to the mobile telephone 1000 from the land-line phone 2000 is made via a network 20 and a base station 10.

FIG. 2 is a function block diagram showing the structure of the mobile telephone.

The mobile telephone 1000 includes: a speaker 1010 outputting audio signals; a microphone 1020 inputting external sound; a control unit 1100; a display unit 1200; a man-machine interface unit 1300; a communication unit 1400; a communication party selection unit 1500; an address book storage unit 1600; a non-carried notification mail storage unit 1700; and a non-carried notification voice message storage unit 1800.

The control unit 1100 includes an operation judgment unit 1110 along with a CPU, memory and the like which are not shown in the figure, and performs a control process unique to the present invention as well as common control processes required for a mobile telephone, such as communication control, mail transmission and reception, and reply message transmission.

The operation judgment unit 1110 included in the control unit 1100 judges whether an operation made through the communication unit 1400 is a specific operation. The operation judgment unit 1110 has a function of, when determining that it is a specific operation, indicating the control unit 1100 to perform a process for transmitting a message that notifies the non-carried state (hereinafter, referred to as "non-carried notification process"). Subsequently, the control unit 1100 controls other function units to perform the non-carried notification process.

The operation judgment unit 1110 also stores, in an internal memory, specific requirements—i.e. the operation procedure for starting the non-carried notification process. These specific requirements can be set and also changed by the user.

Next, the display unit 1200 includes, for example, a liquid crystal display, and has a function of displaying a menu, mails and the like on the display in accordance with an instruction of the control unit 1100.

The man-machine interface unit 1300 includes keys, buttons and the like, and has a function of detecting a user operation, such as pressing down a button, and notifying it to the control unit 1100.

The communication unit 1400 includes a modem circuit, a signal process circuit and the like, and has a function of communicating with the base station 10.

The communication party selection unit 1500 has a function of selecting communication parties to which the non-carried notification message is to be transmitted. There are two kinds of opportunities to select communication parties: in the case of selecting communication parties to which the non-carried notification is to be preemptively made; and in the case of selecting communication parties for notifying that the non-carried state has been cancelled. Selection between these two is made at an instruction of the control unit 1100.

Both two kinds of selection by the communication party selection unit 1500 are made based on an address book; however, in the latter case of selecting communication parties for notifying that the non-carried state has been cancelled, the communication party selection 1500 also selects, in part of the reply process, communication parties to which the non-carried notification has been sent.

The address book storage unit 1600 has a function of storing a so-called address book in which names, telephone numbers, mail addresses and the like are registered. Additionally, the address book storage unit 1600 has a function of storing therein mail addresses and telephone numbers of community parties, which have not been registered in the address book but to which the non-carried notification has been sent. The address book and its related matters will be described later with the aid of FIGS. 3 and 4.

The non-carried notification mail storage unit 1700 has a function of storing therein mails for the non-carried notification. Assume that the mails are preliminarily created and stored therein.

Also the non-carried notification voice message storage unit 1800 has a function of storing therein voice messages for the non-carried notification. Assume that the voice messages are preliminarily stored via a microphone 1020. Note that these voice messages may be stored after converting mails stored in the non-carried notification mail storage unit 1700 into audio.

Part or all of each process performed by the control unit 1100 and other individual units is realized by the CPU executing an appropriate one of various programs.

<Data>

Next, a description is given of main data used by the mobile telephone of the present invention with the aid of FIGS. 3-6. The data is one stored in the address book storage unit 1600 of the mobile telephone 1000.

FIG. 3 shows structural and content examples of an address book 1610.

The address book 1610 includes: a registration number 1611; a name 1612; a telephone number (usual) 1613; a telephone number 1614; a mail address 1615; a group number 1616; notification necessity 1617; notification record 1618; and notification means 1619.

The address book 1610 is information pertaining to a single communication party. One or more of this kind of address books are stored in the address book storage unit 1600.

First, the registration number 1611 indicates an identifier of the address book.

The name 1612 indicates a name of the communication party shown in the address book.

The telephone number (usual) 1613 and telephone number 1614 are telephone numbers of the communication party shown in the address book, and the telephone number (usual) 1613 is one for normal use.

The mail address 1615 is a mail address of the communication party shown in the address book.

The group number 1616 indicates a number representing a group to which the communication party shown in the address book belongs. One or more communication parties belong to each group, and some communication parties may belong to no group. In addition, a single communication party may belong to multiple groups.

In the present invention, the group number 1616 is used in specifying communication parties for sending the non-carried notification.

The notification necessity 1617 indicates whether the non-carried notification is necessary to be sent to the communication party of the address book. When the notification is necessary, the term "required" is written therein; when the notification is unnecessary, the term "not required" is written.

The notification record 1618 indicates whether the non-carried notification has been made or not. When the notification has been made, the term "notified" is written therein; when the notification has not been made, the term "not notified" is written.

The notification means 1619 indicates whether the non-carried notification is made by mail or voice message. In the case when the notification is made by mail, the term "mail" is written therein; in the case of voice message, the term "audio" is written.

The notification method indicated by the notification means 1619 is a method used in the case of preemptively making a notification and in the case of transmitting a notification that the non-carried state has been cancelled. That is, when the replay process is performed, no matter which method the notification means 1619 has been set to, a notification is made by voice message in response to an incoming call and by mail in response to an incoming mail.

Note that, in the notification means 1619, the term "mail" is shown when only the mail address 1615 is written in the address book 1610; the term "audio" is shown when only the telephone number (usual) 1612 or telephone number 1613 is written. However, in the case where a text message can be sent to the telephone number, the notification means 1619 may be set to "mail". This is, for example, when short message service can be used.

For example, here is a communication party whose name 1612 is "Ichiro Tanaka", with the registration of the telephone number (usual) 1613 "090-111-222" and the mail address "xxx@yyyy.co.jp". As the notification means 1619 is written as "mail", a notification is made by mail.

Assume that the group number 1616, notification necessity 1617 and notification means 1619 pertaining to the communication party are preliminarily registered.

Figure 4A:
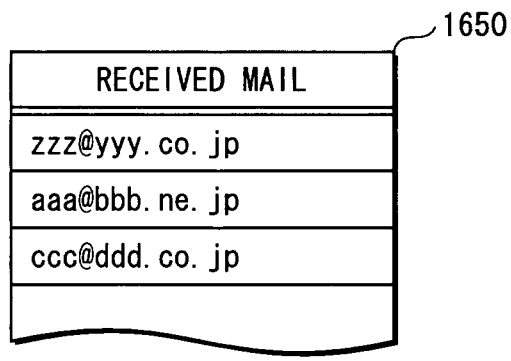
FIG. 4A shows structural and content examples of received mail information 1650.
Figure 4B:
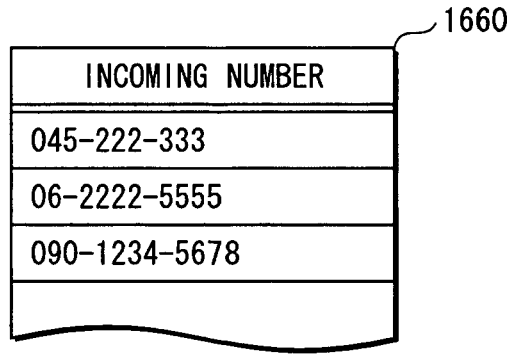
FIG. 4B shows structural and content examples of incoming number information 1660.

Next, FIG. 4A shows structural and content examples of received mail information 1650; FIG. 4B shows structural and content examples of incoming number information 1660.

The received mail information 1650 and incoming number information 1660 are stored in the address book storage unit 1600.

The received mail information 1650 of FIG. 4A is a list of mail addresses of received mails, to which a reply has been made—i.e. a list of mail address to which the non-carried notification mail has been transmitted.

The incoming number information 1660 of FIG. 4B is a list of telephone numbers of received calls, to which a replay has been made—i.e. a list of telephone numbers of communication parties to which the non-carried notification voice message has been transmitted.

In the case when a mail address of a received mail/a telephone number of an incoming call has been registered in the address book, but is not registered in the received mail information 1650/incoming number information 1660, and the notification record 1618 of the corresponding address book 1610 is changed to "notified".

Next, a description is given of the non-carried notification mail and voice message.

FIG. 5A shows an example of a non-carried notification mail 1710; FIG. 5B shows an example of a non-carried notification voice message 1810.

The non-carried notification mail 1710 is a mail transmitted for notifying the non-carried state, and transmitted when the notification is made preliminarily and when in the reply process a reply is made in response to a received mail.

The non-carried notification voice message 1810 is a voice message transmitted for notifying the non-carried state, and transmitted when the notification is made preliminarily and when in the reply process a reply is made in response to an incoming call.

Figure 6A:
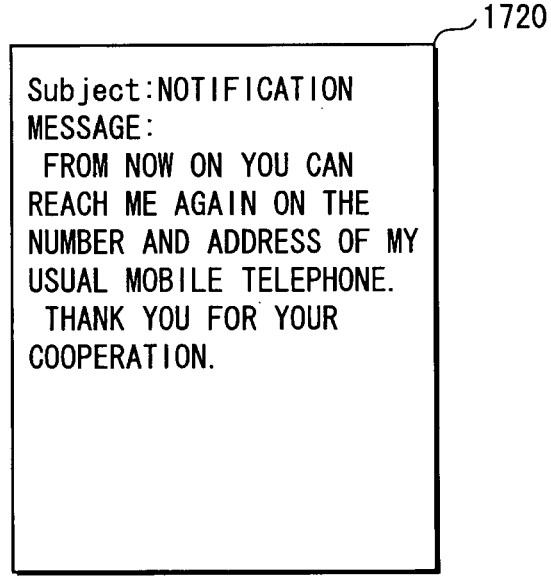
FIG. 6A shows an example of a cancellation notification mail 1720.
Figure 6B:
FIG. 6B shows an example of a cancellation notification voice message 1820.

FIG. 6A shows an example of a cancellation notification mail 1720; FIG. 6B shows an example of a cancellation notification voice message 1820.

The cancellation notification mail 1720 is a mail transmitted for notifying that the non-carried state has been cancelled, and the cancellation notification voice message 1820 is a voice message transmitted for notifying that the non-carried state has been cancelled.

Assume that the non-carried notification mail 1710 of FIG. 5A and the cancellation notification mail 1720 of FIG. 6A are prestored in the non-carried notification mail storage unit 1700, and that the non-carried notification voice message 1810 of FIG. 5B and the cancellation notification voice message 1820 of FIG. 6B are prestored in the non-carried notification voice message storage unit 1800.

<Operation>

Figure 7:
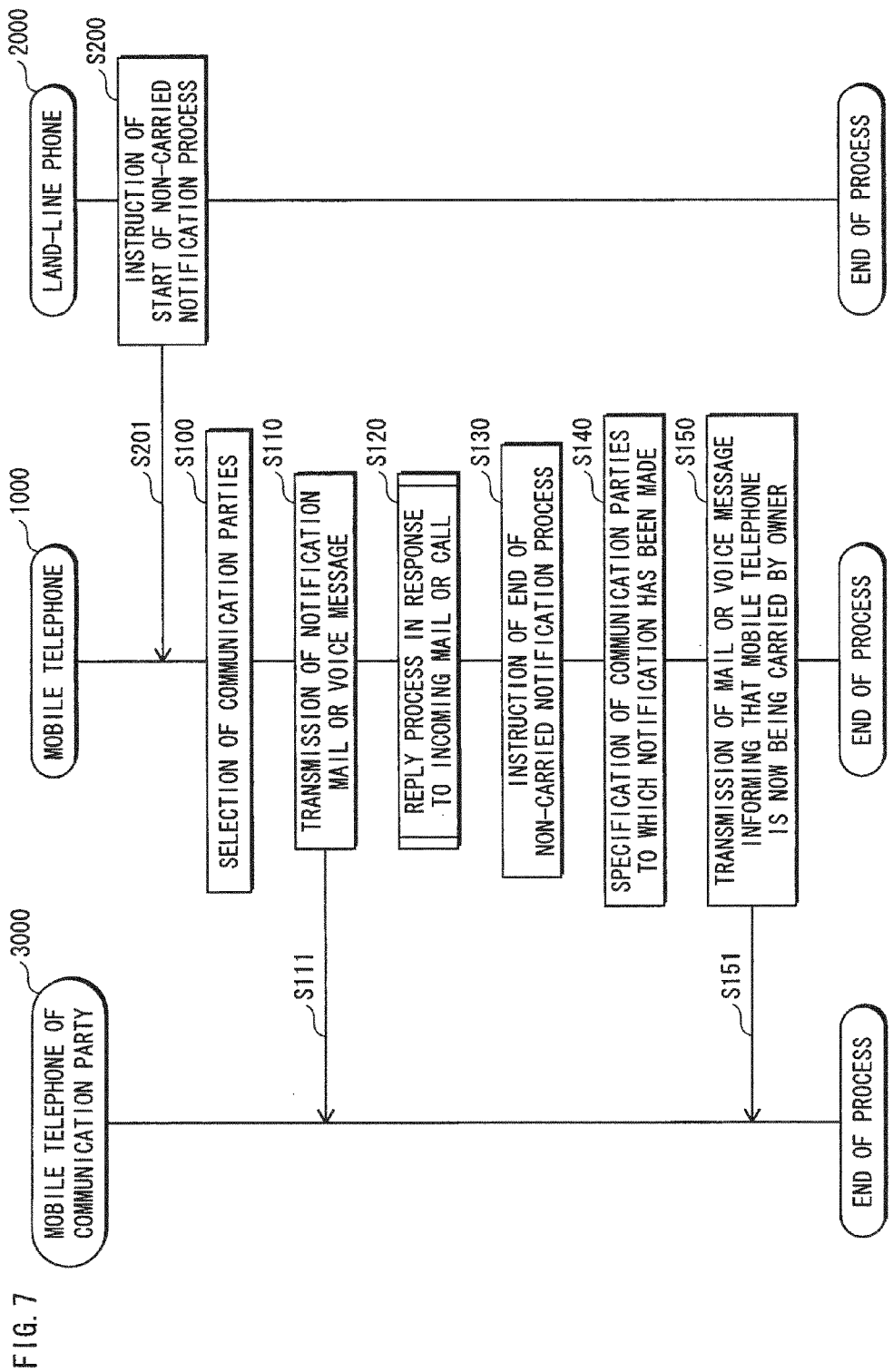
FIG. 7 is a flowchart showing a non-carried notification process.
Figure 8:
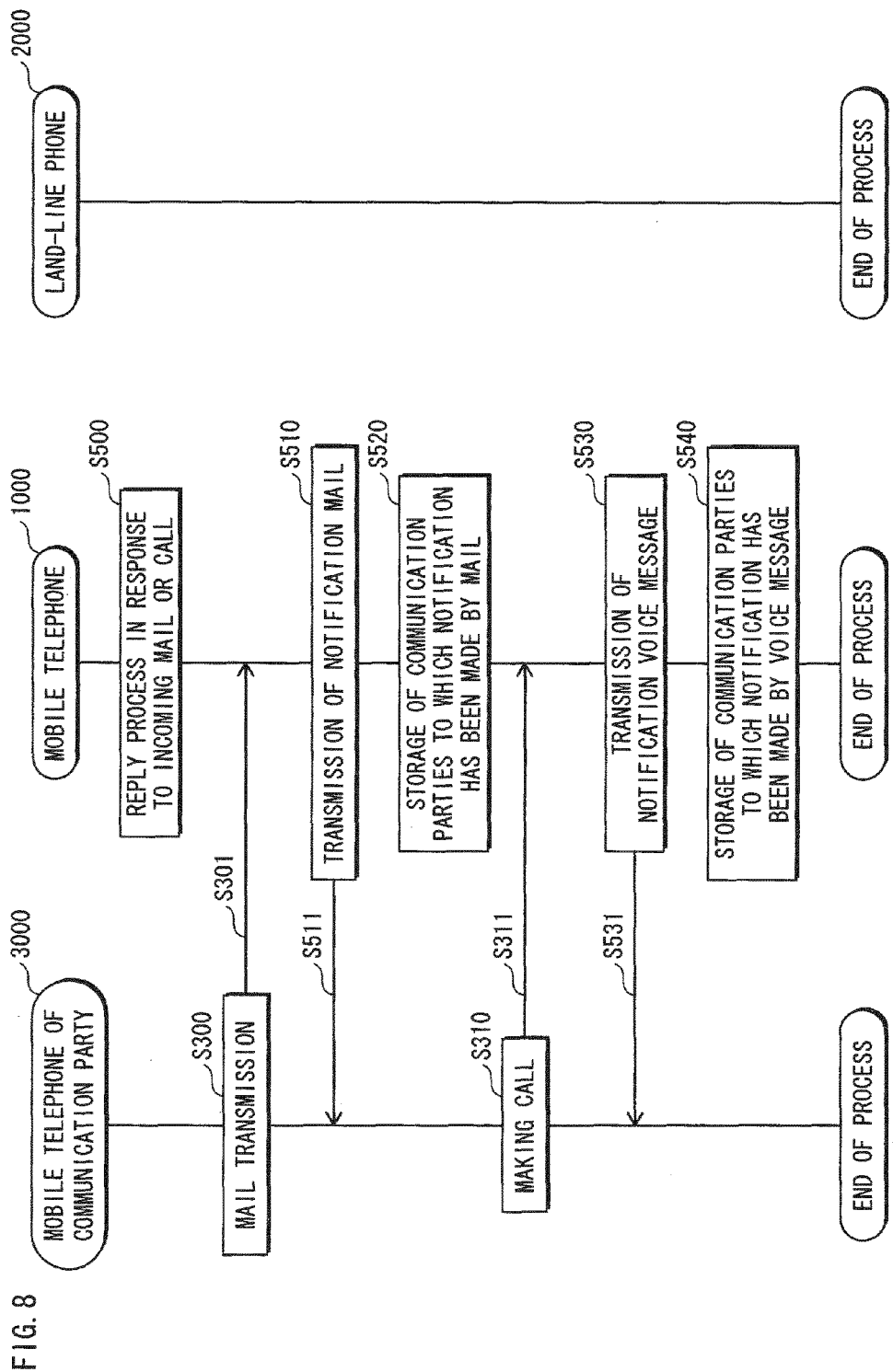
FIG. 8 is a flowchart showing a reply process.

Next, a description is given of operation of the above-mentioned mobile telephone with the aid of FIGS. 7 and 8.

FIG. 7 is a flowchart showing a non-carried notification process.

Here is described an example in which the owner has left the mobile telephone 1000 at home and tries to make a non-carried notification from the land-line phone 2000 at the office to, for example, the mobile telephone 3000 of a communication party to which the non-carried state needs to be notified. Although the notification may naturally be made to multiple communication parties, here is described the case of making a notification only to the mobile telephone 3000 for the convenience of explanation (see FIG. 1).

Assume that, in the present embodiment, the mobile telephone uses radio communication, and that a method of instructing the start of the non-carried notification process is preliminarily set and the non-carried notification process is started in the case where an incoming call is received from a specific telephone number.

In addition, assume that the specification of a communication party to which the non-carried notification is preliminarily made using the group number 1616 (see FIG. 3). Here in the present embodiment, "1" is set to the group number.

First, the owner of the mobile telephone 1000 instructs, from the land-line phone 2000 at work, the mobile telephone 1000 left at home to start the non-carried notification process (Step S200).

The owner makes a call to his/her mobile telephone 1000 from the office land-line phone 2000 which has preliminarily been registered (Step S201).

The mobile telephone 1000 receives the incoming call from the land-line phone 2000. The control unit 1100 detects, via the communication unit 1400, that there was an incoming call, and then gives the telephone number of the source of the incoming call to the operation judgment unit 1110 and requests it to perform a judgment.

On the request, the operation judgment unit 1110 compares the given telephone number and a telephone number stored in the internal memory. When they match, the operation judgment unit 1110 informs the control unit 1110 to start the non-carried notification process; when they do not match, the operation judgment unit 1110 notifies the control unit 1100 to perform a normal process, such as a process of recording a message.

In response to the notification of performing a normal process, the control unit 1100 performs a normal process.

After being informed of starting the non-carried notification process, the control unit 1100 requests the communication party selection unit 1500 to select a communication party for transmitting a notification.

In response to the request; the communication party selection unit 1500 selects, from among the address books 1610 stored in the address book storage unit 1600, an address book whose group number 1616 and notification necessity 1617 are "1" and "required", respectively, and then informs the control unit 1100 to make a non-carried notification (Step S100).

When informing the control unit 1100 to make the non-carried notification, the communication party selection unit 1500 gives, to the control unit 1100, the content of the mail address 1615 in the case where the notification means 1619 is "mail" and the telephone number (usual) 1613 in the case where the notification means 1619 is "audio".

After informing the control unit 1100 to make the non-carried notification, the communication party selection unit 1500 sets "notified" in the notification record 1618 of the address book 1610.

After informed to make the non-carried notification, the control unit 1100 transmits, in the case of receiving the mail address 1615, the non-carried notification mail 1710 (see FIG. 5A) stored in the non-carried notification mail storage unit 1700 to the given mail address 1615. When receiving the telephone number (usual) 1613, the control unit 1100 makes a call to the given telephone number (usual) 1613 and transmits the non-carried notification voice message 1810 (see FIG. 5B) stored in the non-carried notification voice message storage unit 1800 (Steps S110 and S111).

The communication party selection unit 1500 keeps informing the control unit 1100 to make the non-carried notification until all address books, within the address books 1610, whose group number 1616 and notification necessity 1617 are "1" and "required", respectively, are handled. When such address books are all handled, the communication party selection unit 1500 informs the control unit 1100 of the completion.

After informed of the completion, the control unit 1100 subsequently performs a reply process (Step S120). The reply process is a process of notifying the non-carried state as a reply in the case of receiving a mail or an incoming call, and hereinafter explained with the aid of FIG. 8.

Then, when the owner comes home and carries the mobile telephone 1000, and thus the mobile telephone 1000 is no longer in the non-carried state, the owner instructs the end of the non-carried notification process (Step S130).

In the present embodiment, assume that the end instruction is made by selecting an item of non-carried state end from the menu displayed on the display unit 1200 of the mobile telephone 1000.

After detecting selection of the non-carried state end via the man-machine interface unit 1300, the control unit 1100 requests the communication party selection unit 1500 to select communication parties to which the non-carried notification has been made.

On the request, the communication party selection unit 1500 selects, from among the address books 1610 stored in the address book storage unit 1600, an address book whose notification record 1618 is "notified", and then informs the control unit 1100 to make a notification of the non-carried state cancellation (Step S140).

When informing the control unit 1100 to make the cancellation notification, the communication party selection unit 1500 gives, to the control unit 1100, the content of the mail address 1615 in the case where the notification means 1619 is "mail" and the telephone number (usual) 1613 in the case where the notification means 1619 is "audio".

After informing the control unit 1100 to make the cancellation notification, the communication party selection unit 1500 sets "not notified" in the notification record 1618 of the address book 1610.

After informed to make the cancellation notification, the control unit 1100 transmits, in the case of receiving the mail address 1615, the cancellation notification mail 1720 (see FIG. 6A) stored in the non-carried notification mail storage unit 1700 to the given mail address 1615. When receiving the telephone number (usual) 1613, the control unit 1100 makes a call to the given telephone number (usual) 1613 and transmits the cancellation notification voice message 1820 (see FIG. 6B) stored in the non-carried notification voice message storage unit 1800 (Steps S150 and S151).

The communication party selection unit 1500 keeps informing the control unit 1100 to make the cancellation notification until all address books, within the address books 1610, whose notification record 1618 is "notified" are handled.

After finishing searching for address books, the communication party selection unit 1500 reads addresses of received mails from the received mail information 1650 (see FIG. 4A) stored in the address book storage unit 1600 and gives them to the control unit 1100. The control unit 1100 then transmits the cancellation notification mail 1720 to the received mail addresses.

When having transmitted the cancellation notification mail 1720 to all the mail addresses of the received mail information 1650, the communication party selection unit 1500 clears the received mail information 1650.

Similarly, the communication party selection unit 1500 reads telephone numbers stored in the incoming number information 1660 and gives them to the control unit 1100. The control unit 1100 makes a call to the received telephone numbers to transmit the cancellation notification voice message 1820.

When having transmitted the cancellation notification voice message 1820 to all telephone numbers of the incoming number information 1660, the communication party selection unit 1500 clears the incoming number information 1660.

Then, the communication party selection unit 1500 informs the control unit 1100 the completion of the selection of communication parties.

Next, a description is given of the reply process with the aid of FIG. 8.

FIG. 8 is a flowchart showing the reply process.

After informed of finishing the selection of communication parties to which the non-carried notification needs to be pre-emptively made, the control unit 1100 subsequently performs the reply process (see Step S120 of FIG. 7).

The control unit 1100 performs initial processing for starting the reply process—such as reservation of areas, within the address book storage unit 1600, for the received mail information 1650 and incoming number information 1660 (Step S500).

Here, the mobile telephone 3000 transmits a mail to the mobile telephone 1000 (Steps S300 and S301).

After the mobile telephone 1000 receives, via the communication unit 1400, the mail transmitted by the mobile telephone 3000, the control unit 1100 of the mobile telephone 1000 transmits the non-carried notification mail 1710 to the address of the sender of the received mail, i.e. the mail address of the mobile telephone 3000 (Steps S510 and S511).

After transmitting the non-carried notification mail 1710, the control unit 1100 gives, to the communication party selection unit 1500, the address of the sender of the received mail, i.e. the mail address of the mobile telephone 3000, requesting the communication party selection unit 1500 to store it.

On the request, the communication party selection unit 1500 searches the address books 1610 for the given mail address of the sender.

Specifically speaking, the communication party selection unit 1500 searches for an address book 1610 whose mail address 1615 matches the mail address of the sender.

If there is a matching address book 1610, the communication party selection unit 1500 sets "notified" in the notification record 1618 of the address book 1610; if there is no matching address book 1610, the communication party selection unit 1500 registers the mail address of the sender in the received mail information 1650 (Step S520).

The mobile telephone 3000 makes a call to the mobile telephone 1000 (Steps S310 and S311).

After receiving the call from the mobile telephone 3000 via the communication unit 1400, the control unit 1100 transmits the non-carried notification voice message 1810 to the telephone number of the caller, i.e. the mobile telephone 3000 (Steps S530 and S531).

After transmitting the non-carried notification voice message 1810, the control unit 1100 gives to the communication party selection unit 1500 the telephone number from which the call was made, requesting the communication party selection unit 1500 to store it therein.

On the request, the communication party selection unit 1500 searches if the given telephone number is in the address books 1610.

Specifically speaking, the communication party selection unit 1500 searches for an address book 1610 whose telephone number (usual) 1613 or the telephone number 1614 matches the given telephone number.

If there is a matching address book 1610, the communication party selection unit 1500 sets "notified" in the notification record 1618 of the address book 1610; if there is not matching address book 1610, the communication party selection unit 1500 registers the given telephone number in the incoming number information 1660 (Step S540).

<Additional Particulars>

The mobile telephone of the present invention has been described based on the above embodiment. The mobile telephone may, however, be partially modified, and thus it is a matter of course that the present invention is not limited to the embodiment. That is, (1) in the embodiment above, an reception of an incoming call from a specific telephone number is used as an instruction of starting the non-carried notification process; however, the present invention is not limited to this case.

For example, a reception of a specific tone signal during a normal answering message—e.g. a message informing that the call cannot be taken at present—being played may be used as the instruction of starting the non-carried notification process. Namely, that is the case where the telephone owner transmits a specific tone signal by pressing a specific tone key on a push-button phone. With a telephone having keys to each of which a different tone signal has been assigned, it is possible to detect the press of specific keys for entering a pin number, for example.

Also the following cases can be used as the instruction of starting the non-carried notification process: when a predetermined number of times of calls are made within a predetermined time frame; and when the telephone rings a predetermined number of times, or the call state continues for more than a predetermined time period—in other words, when ringback tone is played to the caller more than a predetermined number of times. Note that these predetermined time period and predetermined number of times may either be set by the user or have been preliminarily set.

The specific telephone number may be a number of a mobile telephone or of a land-line phone, or it may be limited to a number of a public telephone.

Also the instruction of starting the non-carried notification process may be made when a specific mail is received. In this case, a unit for analyzing mail content and the like needs to be provided, and the unit judges whether a received mail is the instruction of starting the non-carried notification process. When it is the instruction of starting the non-carried notification process, the non-carried notification process is started.

(2) In the embodiment, communication parties to which the non-carried notification is to be sent are specific using the group number of "1"; however, a different condition may be used for the specification.

Not the group number, but the notification necessity 1617, for example, may be used and all communication parties whose notification necessity 1617 is set as "required" can be preliminarily specific as communication parties for sending the non-carried notification. Furthermore, the user may set some conditions in terms of specifying communication parties for sending the non-carried notification—e.g. communication parties from which a call or mail has been received lately; communication parties from which a call or mail was received yesterday; and only communication parties that are registered in address books in the case when a mail is received.

The group number may be specific using telephone numbers, or the like. For example, when the indication of starting the non-carried notification process is made, the group number can be transmitted. In this case, after informed the start of the non-carried notification process, the control unit 1100 obtains a group number by prompting a message asking for entering the group number.

Also, the user may pronounce a name on the telephone, then the mobile telephone converts the sound to text and searches the field of name in address books using the converted text.

Alternatively, the mobile telephone may convert names in address books from text to sound and play the converted sound. As listening to the sound being played, the user presses a specific key when names of corresponding communication parties are read out. In this case, the mobile telephone needs to have a function for converting from sound to text as well as from text to sound.

In the case where the instruction of starting the non-carried notification process is made by a specific mail, communication parties to which the notification is to be sent may be written in the mail. In this case, a unit for analyzing mail content and the like needs to be provided, and the unit judges whether a received mail indicates the instruction of starting the non-carried notification process. When it indicates the instruction of starting the non-carried notification process, communication parties written in the mail message are determined and the non-carried notification is made to those communication parties.

(3) In the embodiment, the cancellation notification process is started when the item of non-carried state end is selected from the menu displayed on the display unit of the mobile telephone; however, the process may be started in a different manner.

For example, the cancellation notification process may be started when the telephone is removed from the recharger, when the owner makes a call and performs a specific operation, or when a specific mail is received.

In the embodiment, the cancellation notification is made to all communication parties to which the non-carried notification has been made. Instead, a list of communication parties to which the non-carried notification has been made may be displayed, letting the user select communication parties to which the cancellation notification is to be sent, and then the notification is made only to the communication parties selected by the user. In this case, mails used for the non-carried notification may be stored in a specific folder.

(4) In the embodiment, the non-carried notification process is preemptively performed; however, only the reply process may be performed.

In this case, it is necessary to make an instruction when the instruction of starting the non-carried notification process is placed, or that the user preliminarily makes a setting on the mobile telephone.

(5) A program to cause a CPU to execute control processes for realizing respective functions of the mobile phone described in the embodiment (see FIG. 7) may be delivered and distributed after being recorded on recording media, or through various communication channels. Such recording media include IC cards, optical discs, flexible discs, ROMs and flash memories. The delivered or distributed program is put to-use by being stored, for example, in a memory readable by a CPU of an apparatus, and the respective functions described in the embodiment can be realized by the CPU executing the program.

Industrial Applicability

The present invention is useful as a technology for causing, from a remote location, a mobile telephone to transmit a specific mail or the like to a specific communication party

The invention claimed is:

1. A mobile telephone having a mail transmission function, comprising:
   a storage unit storing therein an address book including one or more pieces of mail-transmission destination information each pertaining to a communication party and one or more pieces of necessity information each pertaining to a communication party, a piece of necessity information indicating whether or not a predetermined mail is to be transmitted to a corresponding communication party;
   a judgment unit operable to make a judgment, when an incoming event occurs, whether the incoming event meets a specific requirement;
   a selection unit operable to select one or more communication parties from the address book when the judgment is affirmative, the selected communication parties being one or more communication parties that correspond to one or more pieces of necessity information indicating that the predetermined mail is to be transmitted to a corresponding communication party; and
   a transmission unit operable to transmit the predetermined mail to the selected communication parties using pieces of mail-transmission destination information corresponding to the selected communication parties.

2. The mobile telephone of claim 1, further comprising:
   a destination information specification unit operable to specify the pieces of mail-transmission destination information; and
   an operation unit operable to receive an operation from a user, wherein
   when the operation unit receives a specific operation, the transmission unit transmits a mail relating to the predetermined mail to the pieces of mail-transmission destination information.

3. The mobile telephone of claim 1, wherein
   the address book includes, with respect to each communication party, selection information used by the selection unit to select the communication parties,
   the selection unit receives, when the incoming event occurs, a selection indicator indicating a condition of selecting the communication parties, and
   the communication parties selected by the selection unit are one or more communication parties whose selection information corresponds to the received selection indicator.

4. The mobile telephone of claim 1, wherein
   the specific requirement is that the incoming event occurs a predetermined number of times within a definite time frame.

5. The mobile telephone of claim 1, wherein
   the specific requirement is that the mobile telephone receives a predetermined tone signal.

6. The mobile telephone of claim 1, wherein
   the specific requirement is that the mobile telephone remains in call state for a predetermined period of time.

7. The mobile telephone of claim 1 further comprising:
   an audio transmission unit operable to transmit a voice message, wherein
   the address book includes one or more telephone numbers each pertaining to a communication party, and
   the transmission unit transmits the voice message to telephone numbers of the selected communication parties, instead of transmitting the predetermined mail.

8. A mail transmission method used in a mobile telephone having a mail transmission function, the mail transmission method comprising the steps of:
   storing, in a memory, an address book including one or more pieces of mail-transmission destination information each pertaining to a communication party and one or more pieces of necessity information each pertaining to a communication party, a piece of necessity information indicating whether or not a predetermined mail is to be transmitted to a corresponding communication party;
   making a judgment, when an incoming event occurs, whether the incoming event meets a specific requirement;
   selecting one or more communication parties from the address book when the judgment is affirmative, the selected communication parties being one or more communication parties that correspond to one or more pieces of necessity information indicating that the predetermined mail is to be transmitted to a corresponding communication party; and
   transmitting the predetermined mail to the selected communication parties using pieces of mail-transmission destination information corresponding to the selected communication parties.

9. A non-transitory computer readable medium used in a mobile telephone having a mail transmission function to cause a mail transmission process, the medium having stored thereon one or more sequences of instructions for causing one or more processors of the mobile telephone to perform steps comprising:

storing, in a memory, an address book including one or more pieces of mail-transmission destination information each pertaining to a communication party and one or more pieces of necessity information each pertaining to a communication party, a piece of necessity information indicating whether or not a predetermined mail is to be transmitted to a corresponding communication party;

making a judgment, when an incoming event occurs, whether the incoming event meets a specific requirement;

selecting one or more communication parties from the address book when the judgment is affirmative, the selected communication parties being one or more communication parties that correspond to one or more pieces of necessity information indicating that the predetermined mail is to be transmitted to a corresponding communication party; and transmitting the predetermined mail to the selected communication parties using pieces of mail-transmission destination information corresponding to the selected communication parties.

* * * * *